T. S. MILLER.
TOWING ENGINE.
APPLICATION FILED MAR. 10, 1919.

1,405,612.

Patented Feb. 7, 1922.

WITNESS:
Geo. L. Cheney.

INVENTOR.
Thomas Spencer Miller
BY Gifford M Bull
his ATTORNEY.

T. S. MILLER.
TOWING ENGINE.
APPLICATION FILED MAR. 10, 1919.
1,405,612.
Patented Feb. 7, 1922.
6 SHEETS—SHEET 2.
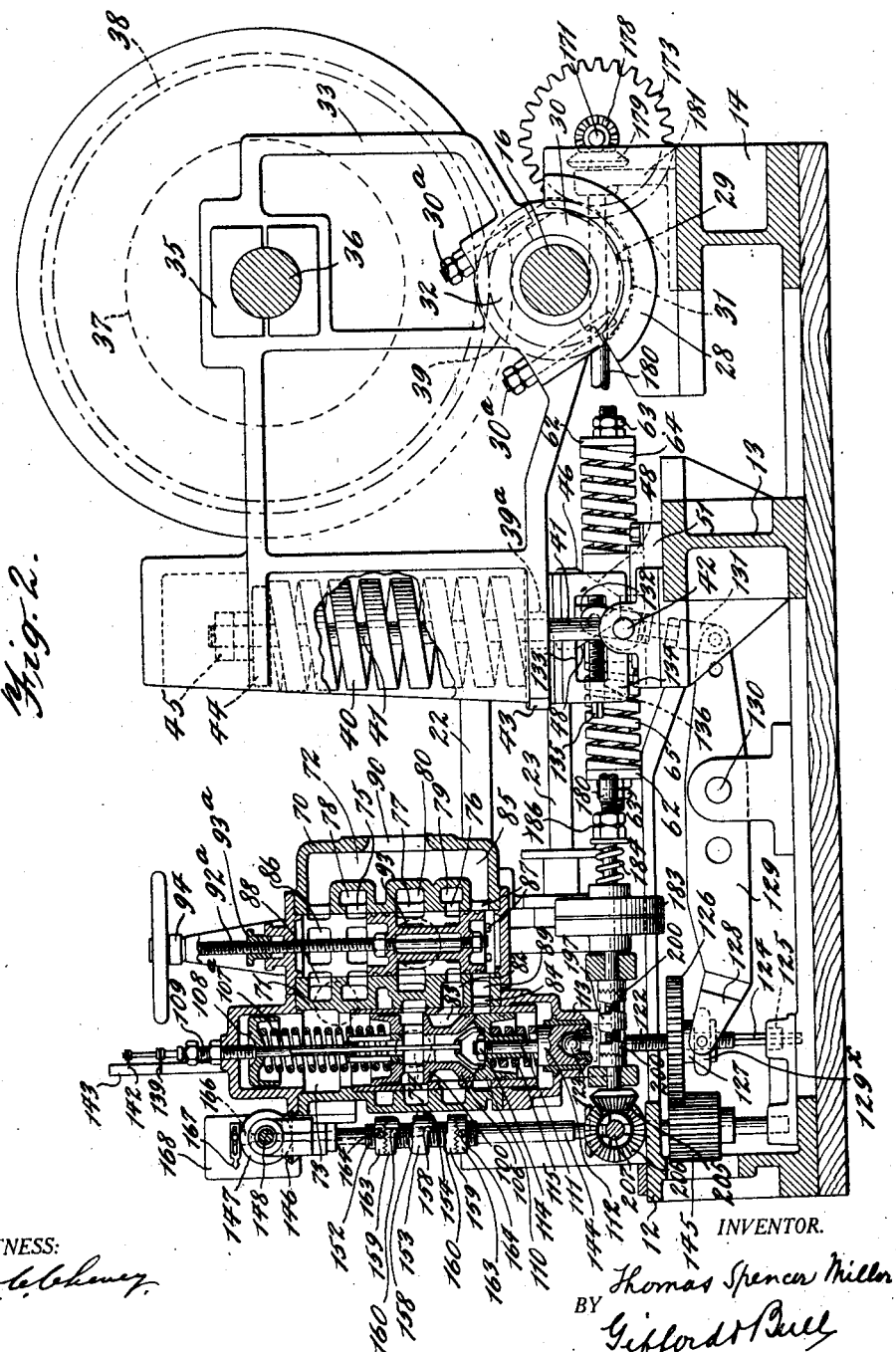
WITNESS:
INVENTOR.
Thomas Spencer Miller
BY
Gifford Bull
His ATTORNEYS

T. S. MILLER.
TOWING ENGINE.
APPLICATION FILED MAR. 10, 1919.

1,405,612.

Patented Feb. 7, 1922.
6 SHEETS—SHEET 3.

WITNESS:
geo. L. Cheney

INVENTOR.
Thomas Spencer Miller
BY Gifford & Bull
his ATTORNEYS

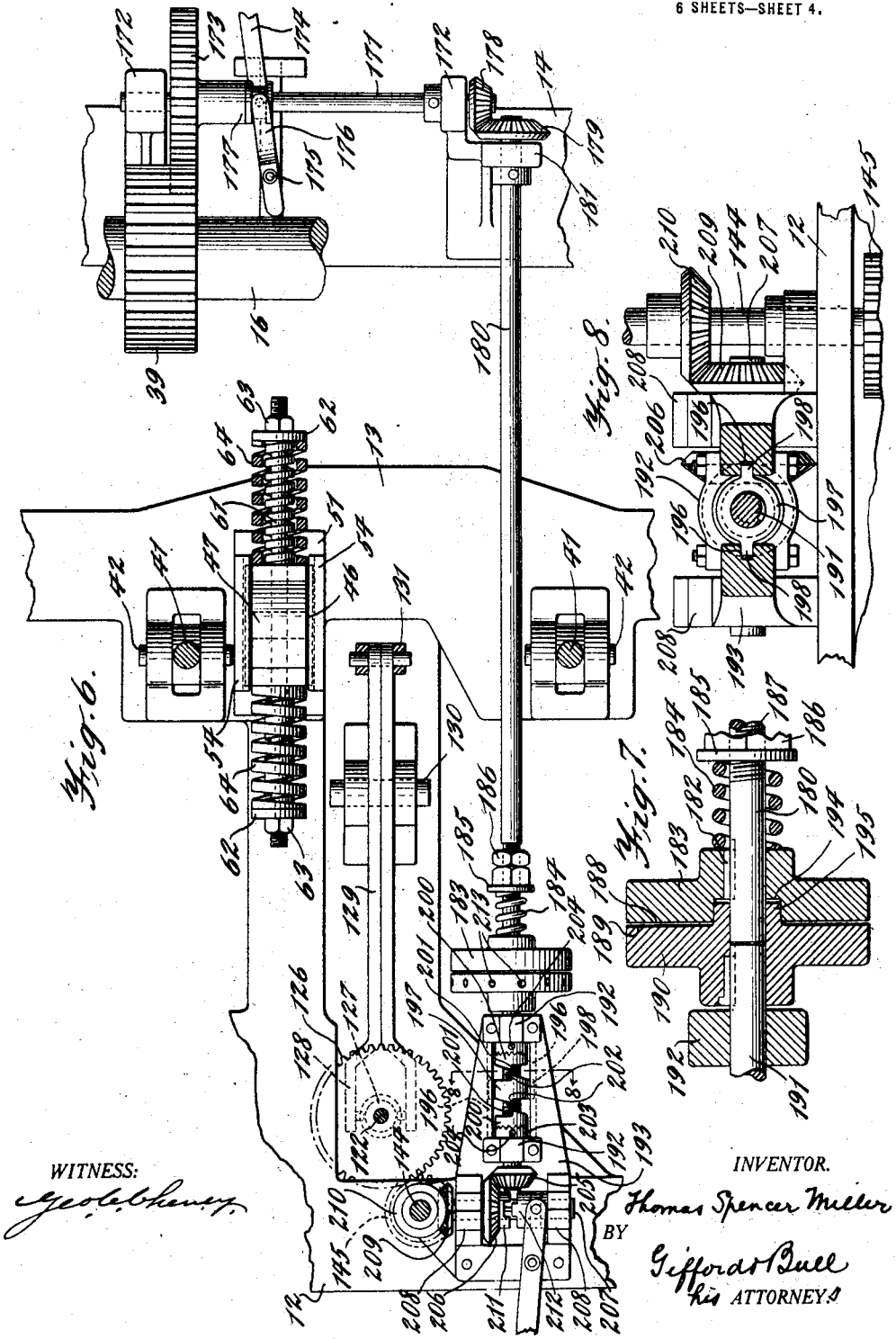

T. S. MILLER.
TOWING ENGINE.
APPLICATION FILED MAR. 10, 1919.
1,405,612.
Patented Feb. 7, 1922.
6 SHEETS—SHEET 5.
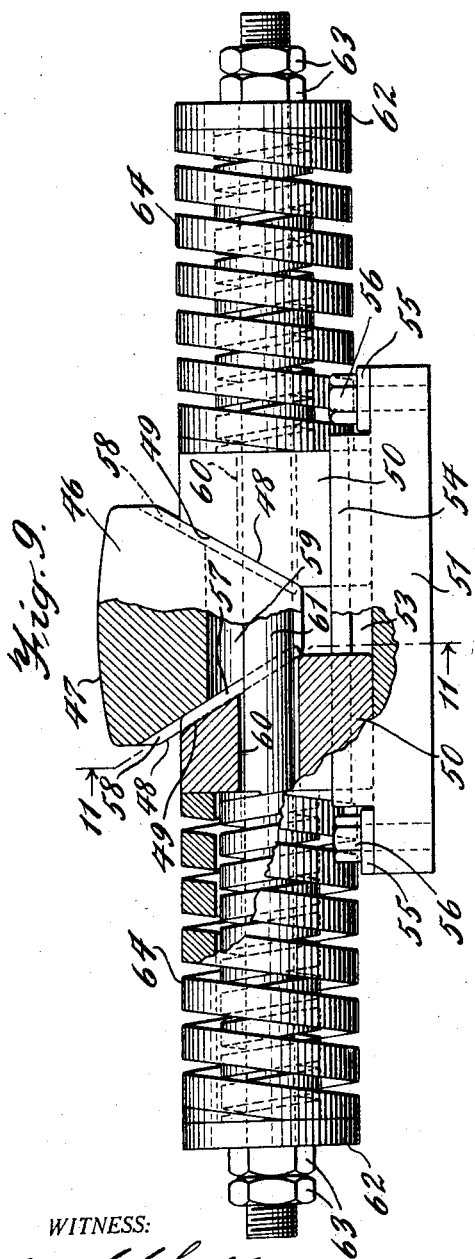
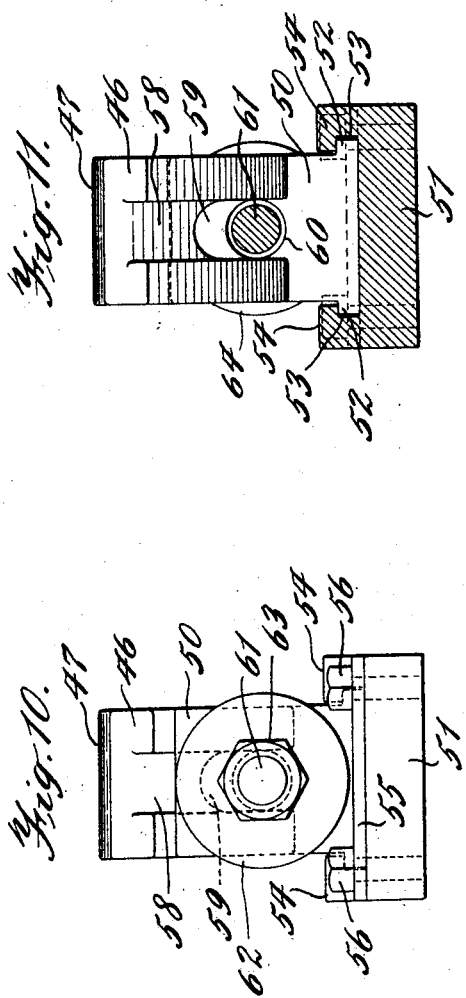
WITNESS:
INVENTOR.
Thomas Spencer Miller
BY
Gifford & Bull
his ATTORNEYS

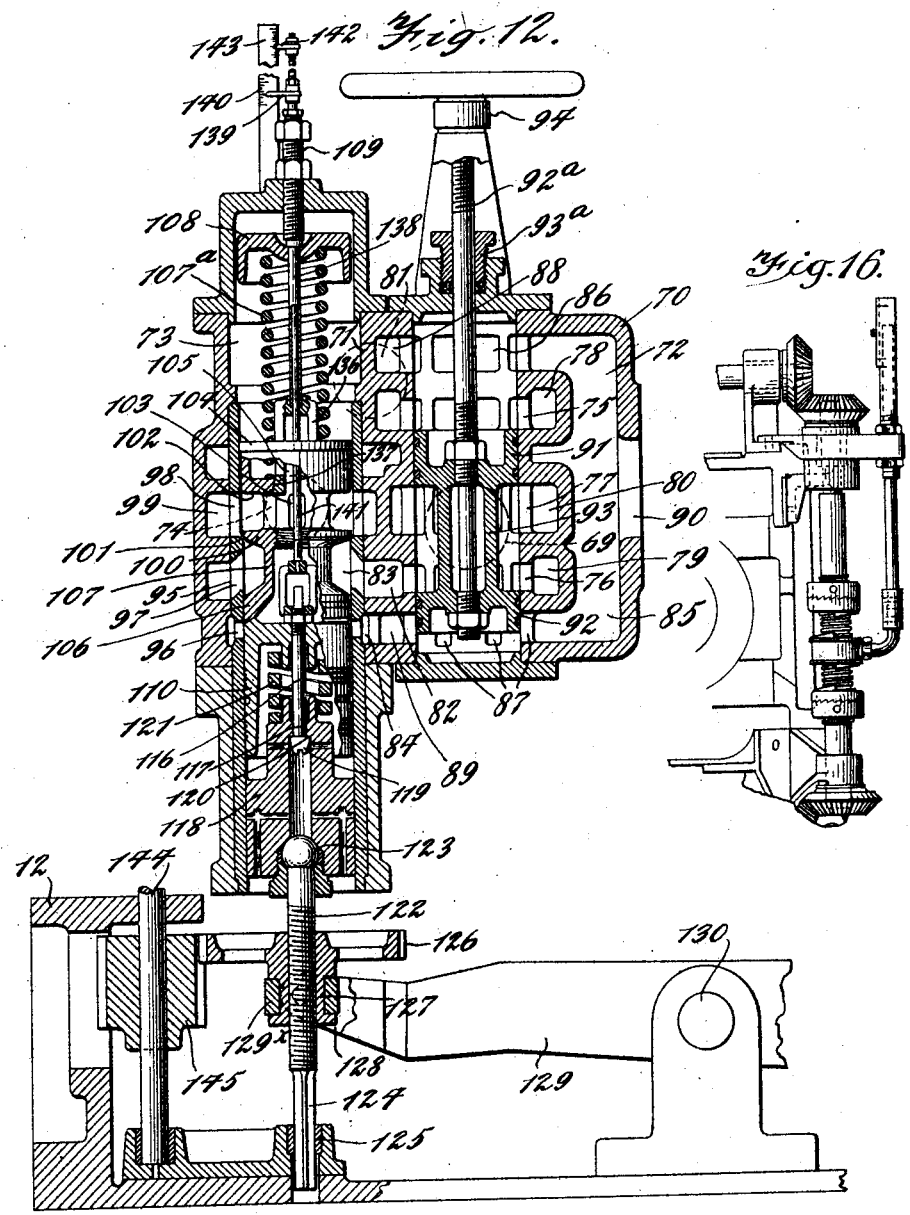

UNITED STATES PATENT OFFICE.

THOMAS SPENCER MILLER, OF SOUTH ORANGE, NEW JERSEY.

TOWING ENGINE.

1,405,612.          Specification of Letters Patent.          Patented Feb. 7, 1922.

Application filed March 10, 1919. Serial No. 281,712.

*To all whom it may concern:*

Be it known that I, THOMAS SPENCER MILLER, a citizen of the United States, residing at South Orange, county of Essex, and State of New Jersey, have invented certain new and useful Improvements in Towing Engines, of which the following is a specification.

My invention relates to new and useful improvements in towing engines of that character or type original with me, and exemplified in my prior applications, Serial No. 177,072, filed June 26, 1917, and upon which Letters Patent No. 1,319,601 was issued October 21, 1919; Serial No. 218,158, filed February 19, 1918, and upon which Letters Patent No. 1,329,023 was issued October 28, 1919; Serial No. 223,931, filed March 22, 1918, and Serial No. 253,217, filed September 9, 1918. The improvements of the present application, are the culmination of a development, the earlier stages of which are represented in said applications.

My invention consists in the improved construction whereby a new towing cycle is made possible to be more fully described hereinafter, and the novelty of which will be particularly pointed out and distinctly claimed.

I have fully and clearly illustrated one embodiment of my invention in the accompanying drawings to be taken as a part of this specification and wherein—

Fig. 2 is a view in side elevation, partly in section, of the construction shown in Fig. 1, certain parts being shown in dotted lines;

Fig. 6 is a detail top plan view, partly in section, of certain controlling means and devices forming part of the invention;

Fig. 7 is a detail sectional view of certain of the elements shown in Fig. 6;

Fig. 8 is a section on the line 8—8 of Fig. 6;

Fig. 9 is a view in side elevation, partly in section, of a buffer device forming part of the invention;

Fig. 10 is a view in end elevation of the structure shown in Fig. 9;

Fig. 11 is a section on the line 11—11 of Fig. 9;

Fig. 12 is a vertical longitudinal section through a controlling valve for controlling the flow of steam to and from the engine cylinders;

Fig. 16 is a detail view in elevation of the controlling device.

Figure 1:
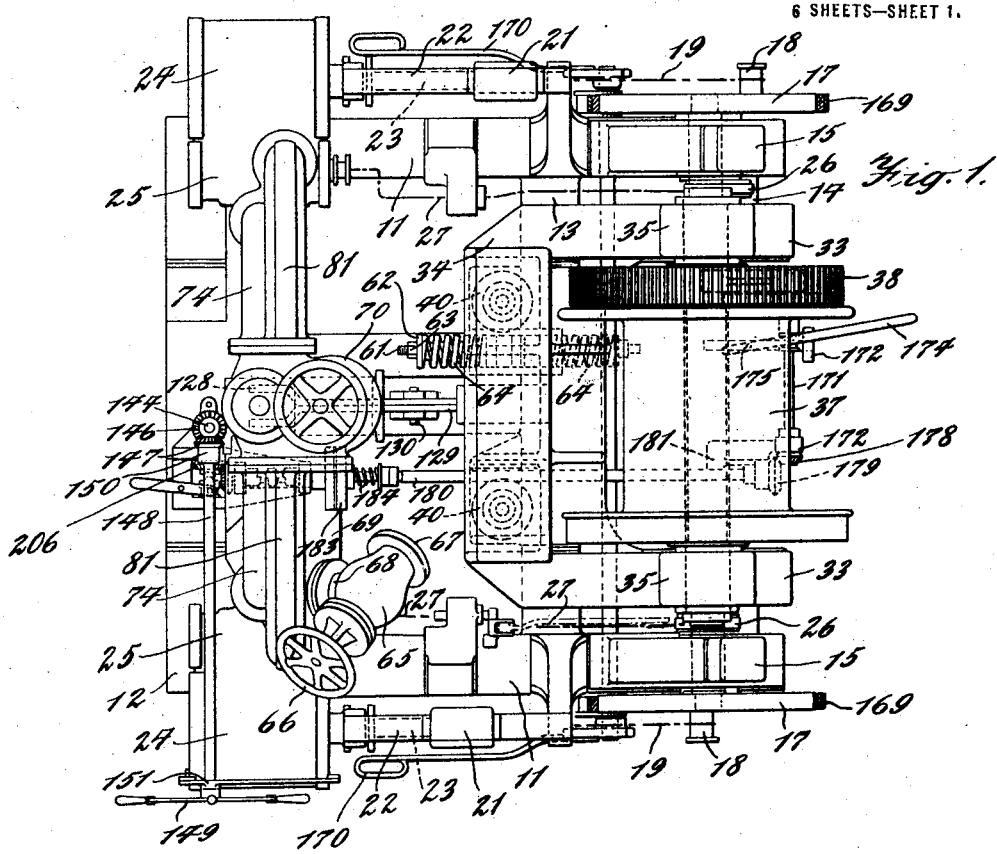
Figure 1 is a top plan view of a towing engine constructed to operate on the principle original with me, and having my present improvements applied thereto.
Figure 13:
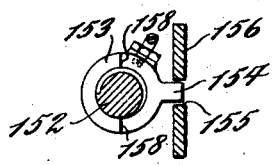
Figs. 13, 14 and 15 are detail views of part of the controlling device shown in rear elevation in Fig. 5.
Figure 3:
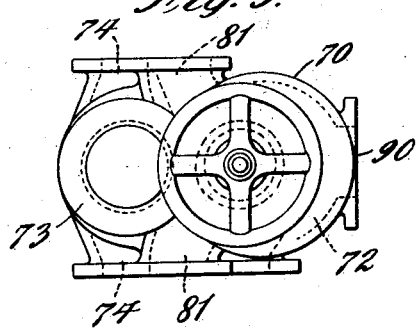
Fig. 3 is a top plan view of a controlling valve.
Figure 15:
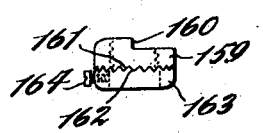
Figure 14:
Figure 4:
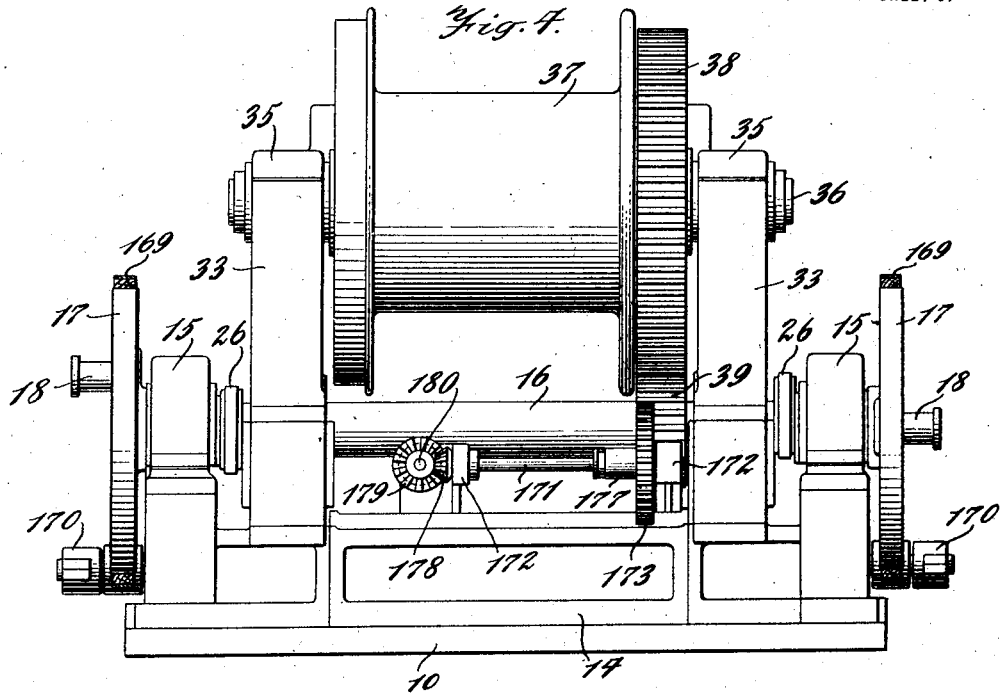
Fig. 4 is a view in front elevation of the construction shown in Fig. 1.

In the drawings and in the description to be given hereafter, I have shown the present invention as being applied to a specific form of towing engine shown in my said application, Serial No. 223,931, but it will be understood that the improvements may be applied to any of the specific embodiments shown in said other applications, without departing from the spirit and scope of my invention.

Referring to the accompanying drawings, I will first describe in detail a construction of a towing engine such as is the subject matter of my said application, Serial No. 223,931, and will then describe the improvements as applied thereto.

In said drawings, 10 designates generally the base frame of the towing engine, said frame consisting of the side members 11 connected by transverse members 12, 13, 14. Above these side members 11 are arranged alining bearings 15, in which turns a horizontally disposed transverse power shaft 16 carrying on its outer ends crank discs 17 having crank pins 18. These crank pins are connected by pitmen, indicated in dot-and-dash lines at 19 in Fig. 1 to cross heads 21 sliding on guide-ways 22, and connected to piston rods 23 of pistons (not shown) in fluid pressure engine cylinders 24 mounted on the said bed frame, said cylinders being provided with slide valves 25 of any well-known and suitable type. In view of the fact that the engine cylinders and slide valves may be of any well-known structure which will serve the purpose for which they are employed, I do not deem it necessary to illustrate or describe the same specifically. The slide valves are driven from eccentrics 26 mounted on the said power shaft 16 and connected to said slide valves by connecting rods, indicated by dot-and-dash lines at 27. I have omitted the pitmen and connecting rods as shown in dot-and-dash lines, in order to simplify the illustration, but those skilled in the art will understand readily how to supply them. The engine cylinders thus previously described, are employed to operate or control the said power shaft 16 in a manner to be presently described.

On the forward portion of the frame are arranged bearing blocks 28, having arcuate upper bearing surfaces 29, located beneath the power shaft 16, and preferably concentric thereto. Arranged on these bearing blocks to rock or turn on the curved surfaces 29 thereof, are rocking members 30 having curved surfaces 31 preferably curved to conform to the curved surfaces 29 heretofore described. The members 30 constitute the lower members of two-part bearings, each of which is completed by an upper bearing part 32 carried by the lower portions of the side members 33 of a rocking frame constituted by said side members and a rear transverse member 34. The bearing members 30 and 32 are secured together by bolts 30ª. The bearing members 30 and 32 embrace the power shaft 16 and serve in part to support the said frame. The shaft 16 is relieved of the weight of the frame and parts, hereinafter described, carried thereby, by the support constituted by the engagement between the members 30 and the members 32, so that the said shaft is relieved from undue strain, and friction between the bearings and the shaft is reduced. On the upper portion of the side members 33 are located alining bearings 35 of any suitable construction, in which turns a drum shaft 36, upon which is mounted a flanged cable drum 37, and keyed to said shaft and fixed to the drum 37 is a driving gear 38 which meshes with a driving pinion 39 fixed to the power shaft 16. By the gearing described, the drum may, under certain conditions, be held against rotation by the motor, and under other conditions, the drum may be driven to take up the towing line wound thereon. The drum 37 is adapted to receive and have wound thereon, a towing hawser (not shown) and any increase in the tension of the hawser or decrease therein, serves to rock the drum and drum frame about said shaft 16; the members 28 and 30 serving as a fulcrum or bearing. This rocking movement is employed to control the action or operation of the engine cylinders to drive the drum to take up the hawser when the tension on the latter is reduced sufficiently below normal, or to permit the drum to be overhauled to pay out the hawser when the tension therein is increased sufficiently above normal. The drum frame and the drum are movable on the shaft 16, this movement, when in the overhauling or pulling direction of the hawser, being opposed by cushioning or yielding means, preferably in the form of coiled springs 40, arranged preferably at the rear of the rocking frame and exerting their force to swing the frame in the inhauling direction. The said springs are of such strength as to oppose the forward movement of the drum frame yielding to the pulling stress of the towing hawser, thus permitting said frame to move forward in outhauling direction, and correspondingly shift the bearing axis of the drum. Should the tension or pull in the tow line drop, the springs exert their force to move the drum frame and the drum in the opposite or inhauling direction, and swing it together with the bearing axis of the drum in a backward direction. I preferably provide two of these springs, the same being of spiral form and carried by tension or pull bars 41 pivotally connected to the bed frame, as at 42, said pull bars extending upwards from the bed frame in rear of the swinging drum frame, as shown in Fig. 2. The springs are confined between a rearwardly extending projection or flange 43 on the swinging frame, which projection extends below the lower ends of the springs, and by compression plates 44 engaging the upper ends of the springs and held in place by nuts 45 threaded on the upper ends of said bars 41. The bars 41 extend upwards through openings 39ª in the said part 43, as indicated in dotted lines in Fig. 2, and in a manner which will be readily understood. By adjusting the nuts 45 lengthwise of the tension bars 41, the compression plates 44 may be adjusted to regulate the expansive force of said springs. From the above description it will be seen that the frame and the drum carried thereby will be movable under changes of tension in the towing line wound on the drum, increases of tension serving to pull said frame forward in the outhauling direction, which movement is opposed by the force of springs 40, while decreases of tension in the towing line will result in said springs exerting their force to rock the drum and drum frame in the inhauling direction. The force of the springs 40 is so regulated as to be under compression, or active under predetermined normal pull on the line, so that a material reduction in normal pull or tension will result in the spring force exceeding said pull, and thereby move the drum or drum shaft in the inhauling direction.

Means is provided for buffing or absorbing any shock which might result from recoil movement of the rocking drum frame, and recoil of the springs 40. This means preferably consists of a buffer device adapted to be engaged by the drum frame, and serving to yieldingly resist movement of said frame in the inhauling direction, and is preferably effective at all times irrespective of the position of the drum frame on its fulcrum. The preferred embodiment of the buffer device comprises a buffer element in the form of a block 46, having a curved upper face 47, adapted to engage the under face of the cross-bar 34 of the drum frame. This block 46 is provided with inwardly inclined faces 48, whereby the said block is substantially wedge-shaped in cross-section, as shown in Fig. 9 of the drawings. The block rests with its inclined faces in engagement with inclined faces 49 on friction blocks 50 located in front and rear of said block 46, which blocks 50 are slidable toward and away from each other, and the block 46, on a guide member 51, rigidly supported on the transverse member 13 of the base frame. The blocks 50 are held in position against vertical movement, and guided in their sliding movement by means of side flanges 52, see Fig. 11, on said blocks arranged in undercut grooves 53 in flanges 54 and the guide member 51. The sliding movement of the blocks 50, away from the block 46, is limited by stops consisting of cross-strips 55 extending across the space between the flanges 54, and held in place by bolts 56, which also serve to secure the guide block 51 to the frame member 13. The block 46 is held in proper position against sidewise displacement from the blocks 50 by means of a tongue 57 on the inclined face 49 of each of the blocks 50, slidably engaging within a groove 58 in each inclined face 48 of the block 46. The block 46 is provided with a central opening 59, and the blocks 50 are each provided with an opening 60, which are in alinement with each other and with the opening 59, and extending through these openings is a bar 61, the ends of which project beyond the rear faces of the blocks 50, as shown in Fig. 9 of the drawings. On each end of the bar 61 is an abutment plate 62, adjustably held in place by nuts 63 threaded on the ends of said bar, and surrounding said bar between each abutment plate and the adjacent block 50, is a spiral spring 64. The spiral springs 64 exert their force or resistance against the blocks 50 to resist yieldingly any outward movement of the latter, due to the inward movement of the block 46 tending to force the blocks 50 apart, and also to force the blocks toward each other to move the block 46 outwards when the pressure on the latter by the drum frame is less than the force exerted by said springs 64. The arrangement is such that the buffer device is constantly in position to function to absorb the recoil of the drum frame and the springs, and to steady the rocking movement of the drum frame. The buffer also serves to steady the action of a controlling valve, as will be more fully set forth hereinafter.

This movement of the drum under changes of tension in the hauling line, is employed to operate a controller, preferably in the form of a controlling valve for the engine, to control the supply and action of fluid pressure, so that when the tension on the line increases, the pressure in the cylinders is reduced or relieved to permit the engine to be overhauled and the line paid out without an abnormal stress in the line; that is, prevent such increase of stress in the line as would exist had the pressure remained constant. Whenever the tension on the towing line falls sufficiently below normal, the supply of fluid pressure is increased, and the engine cylinders operate to drive the drum to wind in the towing line until the limit of the inpulling power of the engine is reached, whereupon the engine is in position to sustain a towing line stress somewhat in excess of its inpulling power, without the pay out of the line. This result is accomplished in the embodiment shown by the operation of a controlling valve for the fluid pressure, which valve will now be described, referring particularly to Figs. 1, 2, 3, and 12 of the drawings.

65 designates a throttle valve of any suitable type, controlled by a hand wheel 66 to control the supply of fluid-pressure, for example, steam derived from any suitable source. It is not necessary to show the connections between the source of pressure and said valve, but such connections may be applied to the inlet end of said valve, indicated at 67 (Fig. 1). The outlet branch 68 of the throttle valve is connected to the inlet duct 69 of the casing 70 of a reversing valve forming part of the controlling valve structure. This controlling valve comprises the said vertically disposed casing 70, divided by a vertical partition 71 into cylindrical chambers 72, 73, the latter being connected by oppositely disposed conduits 74 with the valve chests 25 of the engine cylinders 24, one of said conduits being indicated in dotted lines in Figs. 2 and 12, and both of said conduits being indicated in full lines in Figs. 1 and 3. In the chamber 72 is a cylindrical valveway or cage having upper and lower sets of annular openings 75, 76, and intermediate annular openings 77 communicating respectively with annular passages 78, 79 and 80, respectively. The passage 80 opens to the main steam line supply pipe through the said throttle valve 65, the passage 78 to the exhaust pipe 81 leading from the cylinder valve chests 25, and the passage 79 communicates with a port 82 leading to a cylindrical valveway 83 opening at its upper end into the chamber 73, and at its lower end into a port 84 opening through the valveway in the chamber 72, heretofore described, into the exhaust chamber 85, in the valve casing, the latter also communicating with the exhaust passage 78 through the ports 86, as shown in Figs. 2 and 12. The upper and lower ends of the cylindrical valveway in the valve chamber 72 are connected by means of the by-pass or exhaust chamber 85 through the ports 86, 87, and the passages 88, 89. The main exhaust connection is shown at 90 in Figs. 2, 3 and 12. In the cylindrical valveway or cage in the chamber 72 is arranged a double piston valve having heads 91, 92 connected by a reduced portion 93, the said heads being so spaced that when the valve is moved the space between the heads will span either the openings 76, 77, or the openings 75, 77, so that in the first position the exhaust ports 81 of the cylinder valve chests 25 will be connected to the exhaust 90 of the casing, through the chamber 85, on the one hand, and the steam inlet 69 with the port 82, on the other hand, while in the second position of said valve, the steam inlet 69 will be connected to the port 75 to reverse the flow of steam to the engine cylinders, and the passage 76 will be connected to the exhaust chamber 85 through the passages 87. This piston valve is provided with an extension rod 92ª extending through a stuffing box 93ª in the head of the valve casing, such rod being threaded through a hand-wheel nut 94 rotably mounted on the casing, said hand-wheel nut being operable to shift the valve to either of the positions above set forth, and said rod 92ª being held against rotation by any suitable means, for example, as shown in my said prior applications. In the cylindrical valveway 83 is arranged a cylindrical cage, or liner 95, having openings 96, communicating with the port 84, openings 97 communicating with the port 82 and openings 98 communicating with an annular port 99 in the valve casing and surrounding the said liner. The inlet steam flowing from the inlet port 69 to the port 82 passes through the openings 97 around the head 100, out through the ports 98 into the annular port 99 and thence through the conduits 74 leading to the valve chests 25 of the steam engine cylinders. Arranged to reciprocate in the cage 95 is a puppet valve consisting of a hollow shell having the said head 100 adapted to cooperate with the edge of an annular shoulder 101 constituting a valve seat to control the flow of steam between the chamber 73 and the port 82. The head 100 is provided with an annular passage or groove 102 communicating through openings 103 with the bore of the hollow puppet valve, that portion 104 of the head at the upper end of the latter being formed to slide in contact with the inner surface of the upper portion of the liner 95, and thereby serve as a guide for the reciprocatory movements of the valve. The head is also provided with an opening 105 through which the interior of the valve communicates with the chamber 73. This hollow puppet valve is provided at its lower end with an annular piston head 106 connected to the head 100 by a reduced stem 107 which permits passage of the steam by said valve in passing from port 82, and opening 97, to the chamber 83 and thence to the ducts 74 leading to the engine cylinders. The head 106 terminates at its lower end adjacent the passage 84 so that the chamber 73 may communicate through the bore of the puppet valve with said passage 84 under conditions to be described presently. The puppet valve is normally urged toward its seat by an expansion spring 107ª seated at one end on said valve, and having its opposite end seated in a spring plate 108 in the upper end of the chamber 73, and engaged by an adjusting bolt 109 threaded through the head of the casing, and operable to regulate the expansive force of the spring. Arranged in the liner 95 beneath the head 106 of the puppet valve, is a piston or plunger head 110 which is adapted to engage either the lower end of said head 106 to cut off communication between the chamber 73 and the passage 89 through the puppet valve, or be moved away from said head to permit communication between said chamber 73 and the passage 89. In the form shown in Fig. 2 this piston 110 is carried loosely on a stem 111 having at its lower end an enlarged cylindrical portion 112 slidably disposed in the casing extension 113. The head 110 is movable lengthwise of the stem 111, and is held therein by a holding nut 114 which limits movement of said head relative to said stem toward the lower end of the puppet valve. The head 110 is urged toward the nut 114 by means of an expansion spiral spring 115 surrounding the stem 111 and having its ends abutting the under face of said head, and the part 112 respectively. By this arrangement the head 110 may move yieldingly on its support to serve as a pressure control means in a manner to be presently set forth. In the form shown in Fig. 12, the head 110 is secured on a stem 116, which projects through an opening 117, in a cylindrical part 118 corresponding to the part 112, shown in Fig. 2, said stem being slidable in said opening and having a stop 119 on its inner end cooperating with a shoulder 120 to limit movement of the head 110 away from the part 118. The head 110 is urged toward the puppet valve by means of a spiral spring 121 surrounding said stem, and having its ends abutting the head 110 and the part 118 respectively. This arrangement is for the same purpose as the corresponding construction shown in Fig. 2. The cylindrical part 112, or the part 118, is connected to a vertical threaded rod 122 by a ball and socket joint 123, as shown in Figs. 2 and 12. The rod 122 has a squared or polysided lower end 124 seated in a correspondingly formed seat 125 (shown in dotted lines in Fig. 2 and in full lines in Fig. 12), in the bed-frame 10 to prevent turning of the said stem, but permitting vertical reciprocation thereof. On this rod 122 is threaded a pinion nut 126 having a collar 127 straddled by a yoke 128, on one end of the lever 129, said yoke being pivoted to a sleeve 129˟ surrounding said collar, and said lever being fulcrumed intermediate its ends, at 130, on the main frame. The end of the lever 129, opposite to that bearing the yoke 128, is connected by a link 131 with a block 132 (see Fig. 2), which is slidably disposed in a slot 133 in a bracket 134 rigidly mounted on the lower rear end of the rocking drum frame, for movement therewith. The block 132 is threaded on an adjusting bolt 135 extending longitudinally of the slot 133 and having bearings 136 in the portions of the bracket at the ends of the slots, said bolt being operable to adjust the block lengthwise of the slot and thereby regulate the extent of throw of the lever under the movements of the drum frame.

By this arrangement it will be seen that whenever the drum frame moves in the outhauling direction, due to an increase of tension in the towing line, the rear portion of said drum frame will be raised thereby lifting the bracket 134, which results in swinging the lever 129 to lower the yoke 128, the latter movement serving to permit the valve head 100 to seat at 101, and then when the pull on the towing line is excessive withdraw the valve head 110 from engagement with the head 106. The sliding adjustable connection consisting of the screw 135, and block 132 provides for the proper adjustment of the valve movement, so that it will operate properly when the drum frame moves forward and rearward under changes in tension of the towing line. It will be seen that the block 132 may be moved in either direction lengthwise of the slot 133 by means of the screw bolt 135 to thereby vary the swing of the lever 129, and consequently the extent of movement of the piston head 110 and the valve 100, as long as the head 106 is in contact with the head 110.

In order to show the extent of movement of the puppet valve and to give a visible indication that it is functioning properly, I may provide the upper end of the valve 100 with a yoke 136 threaded into the upper portion of the valve, as at 137, said yoke having connected thereto a hollow rod 138 extending through the plate 108 and through a longitudinal bore in the bolt 109, as shown in Figs. 2 and 12. The upper end of the rod 138 may be provided with an indicator or pointer 139 cooperating with a scale 140 to indicate the extent of movement of the valve. Secured to the valve head 110, in any suitable manner, is a rod 141 extending through the puppet valve, the hollow rod 138, and the bolt 109, to a point beyond the latter, where said rod 141 carries a pointer 142, cooperating with a scale 143 to indicate the extent of movement of said valve head 110.

Means is provided for manual adjustment, regulation and operation of the puppet valve 100, independently of the automatic means controlled by movement of the drum frame, and is useful for the adjustment of the valve when setting it for the desired inpulling power, so that the steam pressure will be properly regulated by the automatic control. This means consists preferably of a vertical shaft 144, carrying a pinion 145 in mesh with the gear 126 on said stem 122, said pinion 145 being long enough to be in constant driving engagement with the gear 126 during all positions of movement or adjustment of the latter lengthwise of the stem 122. On the upper end of the shaft 144 is a bevelled gear 146, which meshes with a bevelled gear 147 on one end of a horizontally disposed operating shaft 148, the opposite end of the shaft 148 carrying a hand-wheel 149, said shaft being journaled in bearings 150, 151 on the main frame. A limiting mechanism is provided to prevent the operator turning the shaft 144 to provide too much steam pressure being fed by the controlling valve, and also to limit the movement of said shaft when cutting off the supply of steam through the controlling valve; for this purpose the shaft 144 is threaded, as at 152, and carries a travelling nut 153 provided with a projection 154, which projects into a vertical slot 155 in a guide-plate 156 rigidly fastened to lugs 157 on the controlling valve casing, the shifting nut 153 being held against rotation by the pin and slot arrangement described, so that the rotation of the shaft 144 will serve to feed the nut 153 lengthwise of the shaft. The nut 153 is provided on its upper and lower faces with locking shoulders 158, for a purpose to be presently described. On the threaded portion 152 and on opposite sides of the travelling nut 153 are threaded stop nuts 159, each having a stop shoulder 160 with which the stop shoulders 158 are adapted to cooperate respectively. The stop nuts 159 are provided each with serrated faces 161 which cooperate with the serrated faces 162 on locking collars 163, which are mounted on the shaft 144 and rigidly fixed thereto by set screws 164, and also by a feather (not shown), if desired. The nuts 159 are adjusted so that the lower one is in a position corresponding to the zero position, or that at which no steam will be fed to the controlling valve, while the upper stop nut is adjusted to a position corresponding to the maximum steam pressure it is desired to have supplied through the controlling valve; the locking collars 163 are then adjusted so that the serrated faces thereof interlock with the serrated faces on the stop locks, and said locking collars are then fastened in position to the shaft by the set screws 164 so as to prevent rotation of the stop nuts relative to the shaft 144, and also prevent movement of the stop nuts lengthwise of said shaft. In manually adjusting the valve, the operator cannot turn the shaft 144 to furnish steam pressure greater than that desired, because when the shaft 144 is rotated to increase the steam pressure, the nut 153 will be fed vertically lengthwise of the shaft and cannot pass the upper lock nut, but the face 158 will engage the corresponding locking face 160 on the stop nut and prevent further rotation of the shaft 144. The same operation takes place when the shaft 144 is turned in the opposite direction to cut off the steam, the feed nut 153 moving downwards and finally locking against the shoulder 160 on the lower stop nut to thereby prevent further rotation of the shaft 144 in the steam cut-off direction.

Figure 5:
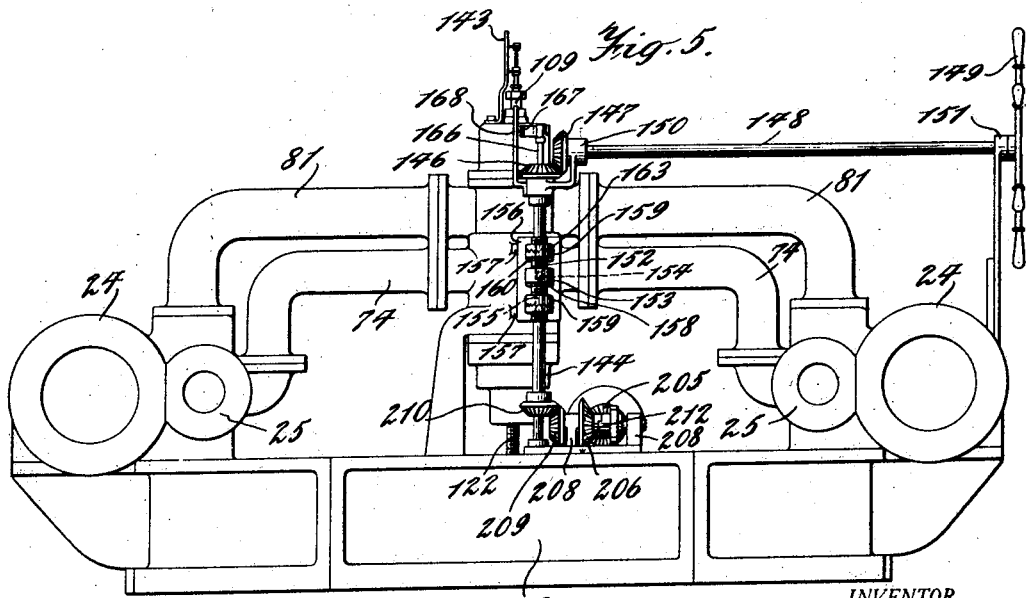
Fig. 5 is a view in rear elevation of a portion of the structure shown in Fig. 1, parts being omitted for the purposes of clearness.

Suitably connected to the feed nut 153, as at 165, is the lower end of a vertically movable rod 166, carrying at its upper end an indicator needle or pointer 167 cooperating with a scale plate 168 (see Figs. 2 and 5). The needle 167 cooperates with a scale 168 to indicate the steam pressure which is being provided by the particular adjustment of the shaft 144.

The operation of the winding engine and its controlling means as so far described, is as follows:—

The towing or winding engine is constructed to automatically take in and pay out the hawser wound on the drum 37 so as to maintain an approximately constant pull on the hawser, and when arranged to function in this manner, it is set to sustain or oppose the pull on the hawser. The normal stress on the hawser or towing line which is to be sustained or opposed by the towing or winding engine, can be regulated by the operator by means of the manual adjustment, i. e., the hand-wheel 149, heretofore described, within a range of, say from 1,000 to 25,000 lbs. or more.

If, for example, the towing engine is to be regulated so as to exert automatically a pull of 18,000 lbs. on the hawser at a pressure of 120 lbs. steam pressure in the engine cylinders, and the valves are opened or raised from the position shown in Figs. 2 and 12, when steam is turned on through the throttle valve 65 the engine will revolve the drum to take up the hawser, and will continue this winding operation until the strain on the hawser increases toward 18,000 lbs. During the winding or setting-up operation, the movable drum frame carrying the drum, will be held in its backward position by the springs 40, that is, in substantially the position shown in Fig. 2 of the drawings. It will be understood that the springs 40 will have an initial force or compression sufficient to hold the drum in this position until sufficient cable stress is applied to the drum and drum frame to tend to pull the drum and drum frame in the outhauling direction. When the pull on the towing line approaches the determined amount, say 18,000 lbs., said pull will serve to gradually swing the drum on its fulcrum in the outhauling direction against the force of the springs 40, this forward movement of the drum frame serving to lift the rear portion thereof, and operating the valve 100 to seat on the shoulder 101 for an instant only, and cut off the supply of steam to the engine cylinders, and if such movement is continued, the head or piston 110 will be withdrawn from the head 106, thereby opening the steam engine cylinders to the exhaust 84 through the hollow puppet valve. The steam pocketed in the engine cylinders 24 will act as a cushion, only to the degree which is required, the exhaust port being instantly closed when the resistance to paying out the towing line is reduced slightly below normal, and valve head 100 is raised slightly to supply the required steam pressure. The point at which the valve 100 closes is determined by the preliminary vertical adjustment of said valve relative to its seat 101 through the operation of the hand-wheel 149, shifting the valve stem 122 by means of the pinion nut 126. This operation, i. e., the adjustment of the valve, having taken place, the drum frame normally maintains a position corresponding to the desired pull on the towing line, so that increases in the tension in said line will serve to further pull the drum frame in the outhauling direction against the force of the springs 40, while decreases in tension will result in the force of said springs being exerted to move the drum frame in the inhauling direction. Should the change of tension in the towing line be increased and the drum frame consequently moved in the outhauling direction, the rear end of the drum frame will be raised, lifting the forward end of the lever 129, and lowering the end having the yoke 128, which is connected to the gear 126, and consequently lowering the stem 122, thereby first lowering valve 100 to its seat 101, then moving the head 110 away from the adjacent end of the valve head 106 to separate it from the latter, the result being that the chamber 73 will be opened to the exhaust port 84 through the hollow puppet valve 100, and the space provided between the lower end of the latter and the head 110, so that the steam will be permitted to escape from the engine cylinders to the exhaust until the pressure is reduced as desired. The escape of steam from the engine cylinders permits the pull on the towing line to overhaul the engine, without materially increasing the pressure in the cylinders. When the tension on the towing line drops to the point determined, the previously compressed springs 40 will lower the rear end of the frame, and through the valve connection cause the stem 122 and the head 110 to move toward the puppet valve, until said head 110 engages the adjacent end 106 of the puppet valve and closes communication between the chamber 73 and exhaust port 84 through the puppet valve, thus maintaining the steam in the cylinders at the required pressure to cushion the pistons and maintain the desired pull on the towing line. By the operation of the hand-wheel 149 in either direction, the connections between the lever 129 and the puppet valve 100 may be changed to regulate the point at which the controlling valve closes, so that the towing engine may be regulated to pull any amount within the limits of capacity of the engine. Should a decrease in tension in the towing line take place, the springs 40 will expand thereby serving to lower the rear end of the drum frame, and swing the drum frame in the inhauling direction, which will serve to raise the stem 122, and consequently lift the valve 100 from its seat, so that the steam inlet through the throttle 65 is opened through the port 69, and the valveway 83, to the chamber 73, and the steam is permitted to flow into the engine cylinders to move the pistons therein to drive the drum in a direction to wind the towing line thereon, and restore the determined tension to said towing line. When the desired tension is reached, the pull on the line moves the drum frame in the outhauling direction, lifting the rear end of said frame against the force of the springs 40, and the valve stem 122 is thereby moved to shift the head 110 to permit the steam pressure and the spring 107 to move the valve 100 towards closed position. The description of the operation just given, applies to the operation of the towing line after the same has been connected to the tow, and it will be understood that in connecting up the towed vessel to the towing vessel, that the automatic valve does not function.

When it is desired to pay out the towing line to connect it to the towed vessel, the hand-wheel 149 is operated to set the puppet-valve 100 to cause the engines to pull, say 4,000 lbs., which raises the said puppet-valve from its seat and establishes communication between the chamber 85 and port 74. The double-headed piston valve 92, 93 is raised to bridge the ports 75, 77, and thus communication is established between the steam supply and the conduit 81 leading to the cylinders. The flow of steam is thereby reversed from what it is during the towing operation, and the engine may be operated to pay out the towing line under power. It will be understood that during the functioning of the engine as a yielding and recovering device for the tow line, the reversing valve is in the position shown in Figs. 2 and 12, and it is only raised to the position just described when it is desired to drive the engine to positively pay out the line. During the operation as a towing engine, the line is paid out by relieving the pressure in the engine cylinders so that the pull can overhaul the drum and the engine.

If desired, one or both of the crank discs 17 may be provided with a brake band 169 operable by a foot lever 170 to retard the power shaft when the towing line has been paid out, or whenever the functions of a brake are desired.

In towing engines internal friction of the towing engine and its parts, including the friction of the steam in its passages, and its condensation has hitherto constituted an important consideration which could not be disregarded, because it, together with the steam pressure, constitutes the two forces which oppose the hawser stress, but one of the advantages of my invention is that within reasonable limits this internal friction may be ignored. By way of explanation, suppose a towing machine could be built which would be frictionless and that it would oppose a 30,000 lb. hawser stress with 100 lbs. steam pressure, in which case the only force opposing the hawser stress would be the force exerted by the steam pressure. In actual practice, however, in an engine of the capabilities mentioned, about 33⅓% (thirty-three and one-third per cent) of the force afforded by the steam pressure would be expended in overcoming the friction in the machine, so that but 20,000 lbs. pull would be available to haul in the hawser. Should the hawser pull exceed 20,000 lbs. it might go as high as the theoretical force exerted by the steam engine—i. e., 30,000 lbs., plus the force expended in overcoming friction—i. e., 10,000 lbs., which equals 40,000 lbs., that is, the hawser might build up as high as 40,000 lbs. before it would overhaul the machine and could become slackened, which obviously would result in an extraordinary overstrain in the hawser which might result in the breaking of the latter. Beside the internal frictions of bearings, gears, etc. contained in the engine, there are serious resistances in the steam passages. It is well-known that the steam upon entering the throttle of any engine suffers a serious drop in pressure before it comes in actual contact to push the piston. This pressure drop is due to friction, radiation of heat, condensation, etc. When such an engine is overhauled, the motion of the piston compresses the steam in the cylinder, which, however, will not move away and clear itself out of the cylinder until the pressure materially exceeds the pressure at the throttle. For instance, if in the operation of an engine at slow speed the pressure drops 15 lbs. between the throttle and the piston, then it would appear that upon overhauling, the cylinder cannot be cleared of its compressed steam until its pressure has reached a point above the steam pressure existing at the throttle.

I have conducted a great number of tests with a dynamometer to determine the ratio of outpulling resistance to inpulling power of double cylinder, single geared, winding engines, and find that the lowest ratio is $2\frac{1}{2}$ to 1 in a machine of high efficiency, while the greatest ratio is 4 to 1 in a machine of extremely low efficiency. These conditions cannot take place in my invention, because the steam pressure is immediately reduced in the cylinders as soon as there is an increase of cable stress above 20,000 lbs. When the hawser pulls beyond 20,000 lbs. the steam is reduced, the hawser is then opposed by the friction of the machine, say 10,000 lbs. plus a stress due to a reduced pressure of steam, say about 12,000 lbs. which equals 22,000 lbs. resistance to overhauling. Then if the hawser pull slackens say to 20,000 lbs., the valve opens and the steam pressure is again increased in the cylinders, causing the engine to wind up the hawser until its stress is again raised to normal, whereupon it is held by the engine until there is either an appreciable drop or rise in the hawser stress. The advantage of this is apparent, because I am able to neutralize the friction within reasonable limits as the total force of the friction and steam pressure can never exist simultaneously in opposition to the hawser when the hawser stress builds up over the determined normal, inasmuch as the steam pressure is immediately reduced whenever the hawser stress rises above normal and there is consequently no force but the friction plus the amount of steam pressure permitted to exist by the opening of the controlling valve in proportion to the degree to which said valve is open. All of the above has assumed that there is no friction in the elements necessary to communicate the movement of the drum frame to the valve. It is clear that the more frictionless these elements are, the more nearly uniform can the hawser stress be maintained. However, for practical reasons a slight increase in hawser stress without the engine being overhauled is advantageous because in smooth seas slight raises in hawser stress will not require any movement of the engine. This effects a saving of steam.

For example: A winding-in hawser stress of about 18,000 lbs. and an outhauling hawser stress of about 22,000 would mean that the engine would stand still until the hawser stress exceeds 22,000 lbs., on the one hand, or dropped below 18,000 lbs. on the other. The difference in hawser stress in above example is 4,000 lbs. If the difference in hawser stress is much greater than 4,000 lbs., then stronger and heavier hawsers must be provided.

The manual adjustment heretofore described, may be employed by the attendant to raise or lower the steam pressure to vary it from that provided by the automatic control, whenever the towing conditions make it desirable to do so, for example, a heavy wave or surge might throw the boats apart with such force as to create an excessive tension in the hawser, which acting through the automatic control might cause the engine to pay out more of the hawser than might be desirable, in which event, the attendant, by adjustment of the manual control, could increase the steam pressure above that afforded by the manual control, in order to prevent too much of the line being paid out. On the other hand, there might be an excess of slack in the hawser to such an extent that the automatic control might wind in the hawser until it would be too short, under which conditions, the operator could operate the manual control to lower the steam pressure so that the engine would wind in only that length of hawser which would be desirable.

My present invention contemplates the addition to and combination with the construction heretofore described, of means for automatically performing the operations just described as being capable of performance manually by the attendant, and I will proceed to describe this means. 171 designates a horrizontal shaft journalled in brackets 172 on the forward part of the frame and having splined thereon a gear 173 adapted to be thrown into mesh with the driving gear 39 on the shaft 16 by means of a shifting lever 174 fulcrumed on the main frame as at 175, and having a yoke 176 pivotally engaging the hub 177 of said gear. The shaft 171 also carries a bevelled pinion 178 meshing with a bevelled pinion 179, fixed to one end of a shaft 180, which has bearing at one end in a bracket 181 on the main frame. The opposite end of the shaft 180 has splined thereto, as at 182, to move longitudinally thereof, but to rotate therewith, a friction clutch member 183, which is urged lengthwise of the shaft by an expansion spring 184 surrounding the shaft and reacting against the rear face of the said clutch member and an adjustable abutment on the shaft, the abutment consisting preferably of a washer 185, and holding nuts 186 threaded on the shaft, as at 187. The clutch member 183 is provided with a friction surface 188 which contacts a friction face 189 of a friction clutch member 190, keyed to one end of a threaded shaft 191 mounted in bearings 192 in a bracket 193 fixed on the main frame. The friction face of the clutch member 188 is provided with a cylindrical recess 194 to receive a cylindrical boss 195 on the member 190, the arrangement being such as to provide for the support of the clutch bearing end of the shaft 180, and maintain the clutch heads in proper relation. The bracket 193 is provided with slots 196 (see Fig. 6), in which is located a travelling nut 197 having fins 198 projecting into the slots 196 in said bracket, to prevent rotation of said nut, said nut being threaded on the said shaft 191 to be moved lengthwise thereof in both directions, corresponding to the direction of rotation of the shaft. Fixed to the shaft 191 to rotate therewith and located on opposite sides of the travelling nut 197, are stop nuts 200, 200, provided respectively with clutch or stop faces 201 adapted to cooperate with clutch faces 202, on the travelling nut 197, so that when the travelling nut contacts the said clutch face of one or the other of the stop nuts, said traveling nut being held against rotation will prevent rotation of the shaft upon which the stop nuts are mounted. The nuts 200 are threaded on the shaft 191 and have serrated rear faces to interlock with serrated faces on the locking collars 203 which are adapted to be rigidly locked to the shaft by set-screws 204. The nuts 200 are adjustable in the same manner as the nuts 159 heretofore described, and that description need not be repeated. At its end opposite to that carrying the clutch member 190, the threaded shaft 191 is provided with a bevelled gear 205 which meshes with a bevelled gear 206 loose on a shaft 207 mounted in bearings 208 on the bracket 193, and carrying a bevelled gear 209 fixed to said shaft, and which meshes with a bevelled gear 210 keyed to the shaft 144 heretofore described. The arrangement just described is such that rotation of the shaft 191 will, through the interposed gearing, drive the shaft 144 to either increase or decrease the steam pressure on the engine cylinders provided by the controlling valve. The gear 206 is loose on the shaft 207 and is provided with a positive clutch member 211, which cooperates with a positive clutch member 212, which is feathered to the shaft 207 as at 213 (see Fig. 6), and is adapted to be moved lengthwise thereof by any suitable manual means to either couple the gear 206 to, or uncouple it from the shaft 207, and consequently connect the automatic control to, or disconnect it from the manual control. When the manual control is to be operated independently of the automatic control, the clutch member 212 is disengaged from the pinion 206, so that turning of the latter by the automatic control will not affect the adjustment of the valve. The cycle of operation of the automatic control just described, is as follows: When the tension on the towing hawser is increased sufficiently to cause a reduction of steam pressure in the engine cylinders through the operation of the automatic controlling valve, the steam pressure will first be reduced, causing the drum to be overhauled by the hawser, which will result in the latter being paid out without abnormal stress; that is, at a tension materially less than that which would have resulted had the steam pressure remained constant. As soon as the drum starts to pay out the hawser, the gear 39 will drive the gear 173 and the connecting parts to rotate the shaft 180, the shaft 191, gear 205, gear 206, shaft 207, gear 209 and gear 210, to turn the shaft 144 to increase the steam pressure, this increase taking place while the hawser is being paid out and causing an increase in hawser pull. As soon as the shaft 180 and the shaft 191 start to rotate, as just described, the travelling nut 197 will move toward the right of Figs. 2 and 6 lengthwise of the shaft section 191 toward the stop nut, such movement continuing until the locking face 202, on the travelling nut engages the locking face 201 on the nut 200 to the right of the travelling nut, whereupon the travelling nut will prevent further rotation of the shaft 191, and consequently adjustment of the shaft 144, and prevent further increase of steam pressure, and hawser tension, whereupon, the clutch member 189 will also be held against rotation, and the clutch 188 continuing to rotate, will slip relative thereto during the continued rotation of the drum while being outhauled. As soon as the hawser slackens for any reason the steam pressure will increase and the engine will begin to wind in, under which circumstances the shafts 180, 191 will rotate together in the opposite direction from that heretofore described, and the clutch will function without slippage, gradually reducing the rope pull and the steam pressure from the maximum toward the highest point desired, i. e., until the travelling nut 197 has collided with the stop nut 200 to the left of Fig. 2 and 6, to stop rotation of the shaft 191. If then, there is any further winding-in action, the clutch will slip, and the drum continue to wind in the hawser without further automatic adjustment of the steam pressure and the cycle is complete. The position of the travelling nut 197, relative to the shaft 191, may be adjusted to provide various pressures desired, for given positions of the shaft 144, by rotating the said shaft 191 relative to the shaft 180, this being brought about by merely rotating the clutch head 190, the latter being provided with sockets 213 adapted to receive an operating bar or rod by which said head may be rotated. The operation of the preferred embodiment of the invention just described constitutes a new cycle of operation, and may be briefly stated as follows: When the engine is overpowered there will be a sudden decrease of steam pressure permitting the hawser or line to overhaul the drum and pay out, and as the line pays out, the steam pressure will be increased gradually. When the hawser slackens, the steam pressure will be suddenly increased, the drum thereupon operating to wind in the hawser, and as the hawser is wound in the steam pressure will be gradually reduced. The steam pressure cycle upon increase of hawser stress is (a) decrease of steam; (b) gradual increase of steam; (c) sudden increase of steam above (b), and then (d) gradual decrease of steam, i. e., to the pressure existing previous to operation (a).

The function of the spring 115 shown in Fig. 2, and also that shown in Fig. 12 is as follows:—It will be noted that the exhaust valve head 110 is free to slide up or down in the liner, and that the valve-stem head 118 is connected to the valve-stem 122, which is actuated through the lever 129 by the rocking movement of the drum frame. The exhaust valve 110 is held in the same relative position to the head 118 by means of the coil spring 115 of Fig. 2, or 121 of Fig. 12, which normally maintains the head 110 and the head 118 separated, and by means of a bolt 116 (see Fig. 12), or the stem 111 (see Fig. 2) which prevents said parts 110 and 118 from separating. When the steam enters the cylinders by the valve seat 101, this steam goes through the center of valve 106 to the top of and exerts its pressure on the top of the valve head 110. The steam pressure on top of the valve 110 tends to compress the spring 115 (see Fig. 2) or 121 (see Fig. 12), thereby lowering the exhaust valve 110 and permitting the steam valve 106 to approach its seat at 101. Should the steam pressure in the upper part of the valve and on the head of valve 110 increase, the spring 115, or the spring 121 will be compressed further, permitting the steam valve 106 to seat at the seat 100 and shutting off the supply of steam, thereby allowing the steam pressure in the upper valve and on the head of valve 110 to decrease. In this manner the spring functions in such a way as to regulate the pressure of steam to the cylinders, and to keep the same approximately constant. Should the pressure on the head of the exhaust valve 110 decrease below that desired, the spring will force this valve upward, raising the valve 106 from its seat permitting more live steam to flow to the cylinders until the original pressure is restored. By this arrangement, it will be seen that when there is a decrease of steam pressure below that required, the spring serves to lift the head 110 to raise the controlling valve to permit sufficient steam to flow to the cylinders to raise the pressure to the point required, while on the other hand, should the pressure in the cylinders increase beyond the point desired, such pressure will depress the head 110 and permit the steam valve 106 to seat and cut off further supply of steam until such time as the pressure is reduced to the desired point. If the steam pressure should be excessively higher than desired, such pressure will depress the head 110 to separate it from the valve 106, and thereby open the cylinders to the exhaust, until the pressure is reduced the desired amount.

It will thus be seen that means is provided whereby the steam pressure may be varied by automatic means which acts independently of the automatic control performed by the rocking motion of the drum. It will also be seen that the automatic regulating mechanism which is called into play by the rocking movement of the drum, and the auxiliary automatic mechanism may operate concurrently in controlling the tension of the line, or that by manipulation of the clutch 212, the auxiliary automatic mechanism may be disconnected, and the automatic regulating mechanism perform the controlling function. It will also be seen that this invention operates to maintain as nearly as practicable, a uniform tension in the hawser, and also to maintain as nearly as practicable a uniform length of hawser.

What I claim and desire to secure by Letters Patent of the United States is:—

1. In a towing engine, a winding drum, a fluid pressure operated engine for operating said drum, means whereby an increase of stress on a hawser wound on said drum causes a reduction of fluid pressure on said engine to permit the drum to pay out the hawser, and automatic means operable in accordance with the length of cable paid out for increasing the fluid pressure while the hawser is being paid out.

2. In a towing engine, a winding drum, a fluid pressure operated engine for operating said drum, means whereby an increase of stress on a hawser wound on said drum causes a sudden reduction of fluid pressure on said engine to permit the drum to pay out the line, means for automatically raising the fluid pressure in opposition to the paying out of the hawser, and means whereby said last-named means ceases to operate upon the fluid pressure being raised to a determined point.

3. In a towing engine, a winding drum, a fluid pressure operated engine for operating said drum, means whereby an increase of stress on a hawser wound on said drum causes a reduction of fluid pressure on said engine to permit the drum to pay out the hawser, and means driven by the drum for increasing the fluid pressure while the hawser is being paid out.

4. In a towing engine, a winding drum, a fluid pressure operated engine for operating said drum, means whereby an increase of stress on a hawser wound on said drum causes a reduction of fluid pressure on said engine to permit the drum to pay out the hawser, means driven by the drum for increasing the fluid pressure while the hawser is being paid out, and a slip connection between said drum and said last-named means.

5. In a towing engine, a winding drum, a fluid pressure operated engine for operating said drum, means whereby an increase of stress on a hawser wound on said drum causes a reduction of fluid pressure on said engine to permit the drum to pay out the hawser, and a decrease of tension on the hawser causes an increase of fluid pressure on said engine to cause the drum to wind in the hawser, and means for automatically increasing the fluid pressure during the paying out of the hawser, and for reducing the fluid pressure during the winding in of the hawser.

6. In a towing engine, a winding drum, a fluid pressure operated engine for operating said drum, means whereby an increase of stress on a hawser wound on said drum causes a reduction of fluid pressure on said engine to permit the drum to pay out the hawser, and a decrease of tension on the hawser causes an increase of fluid pressure on said engine to cause the drum to wind in the hawser, and means for increasing the fluid pressure during the paying out of the hawser, and for reducing the fluid pressure during the winding in of the hawser, said last-named means being driven by the drum.

7. In a towing engine, a winding, drum, a fluid pressure operated engine for operating said drum, means whereby an increase of stress in a hawser wound on said drum causes a reduction of fluid pressure on said engine to permit the drum to pay out the hawser, and a decrase of tension on the hawser causes an increase of fluid pressure on said engine to cause the drum to wind in the hawser, means for increasing the fluid pressure during the paying out of the hawser, and for reducing the fluid pressure during the winding in of the hawser, said last-named means being driven by the drum, and a slip connection between said drum and said last-named means.

8. In a towing engine, a winding drum, a fluid pressure operated engine for operating said drum, valve means for controlling the fluid pressure on said engine, means whereby an increase of stress on a hawser wound on said drum automatically operates said valve to reduce the pressure on said engine, and automatic means operable in accordance with the length of hawser paid out, and independent of said first-named means, for operating said valve to increase fluid pressure while the drum is paying out the hawser.

9. In a towing engine, a winding drum, a fluid pressure operated engine for operating said drum, valve means for controlling the fluid pressure on said engine, automatic means whereby the increase of stress on a hawser wound on the drum causes a decrease of fluid pressure on the engine, and a decrease of tension on the hawser results in an increase of fluid pressure on the engine, manual means for controlling said fluid pressure, and means acting automatically through said manual means to raise the fluid pressure while the hawser is being paid out, and lower it when the hawser is being wound in.

10. In a towing engine, a winding drum, a fluid pressure operated engine for operating said drum, valve means for controlling the fluid pressure on said engine, automatic means responsive to movements of the drum, whereby the increase of stress on a hawser wound on the drum causes a decrease of fluid pressure on the engine, and a decrease of tension on the hawser results in an increase of fluid pressure on the engine, manual means for controlling said fluid pressure, and means acting automatically through said manual means to raise the fluid pressure while the hawser is being paid out, and lower it when the hawser is being wound in.

11. In a towing engine, a winding drum, a fluid pressure operated engine for operating said drum, means whereby an increase of stress on a hawser wound on said drum causes a reduction of fluid pressure on said engine to permit the drum to pay out the hawser, and means for automatically increasing the fluid pressure while the hawser is being paid out.

12. In a towing engine, a winding drum, a fluid pressure operated engine for operating said drum, means whereby an increase of stress on a hawser wound on said drum causes a reduction of fluid pressure on said engine to permit the drum to pay out the line, and means for automatically increasing the fluid pressure while the hawser is being paid out, and for stopping said increase after a portion of the hawser has been paid out.

13. In a towing engine, a winding drum, a fluid pressure operated engine for operating said drum, valve means for controlling the fluid pressure on said engine, automatic means responsive to movements of the drum, whereby the increase of stress on a hawser wound on the drum causes a decrease of fluid pressure on the engine, and a decrease of tension on a hawser results in an increase of fluid pressure on the engine, means independent of said automatic means for controlling said fluid pressure, and a second automatic means acting through said last-named, independent controlling means to raise the fluid pressure while a portion of the hawser is being paid out, and lowering it while a portion of the hawser is being wound in.

14. In a towing engine, a winding drum, a fluid pressure operated engine for operating said drum, and means whereby an increase on the hawser stress causes a reduction of fluid pressure on the engine, followed by the raising of the fluid pressure while the hawser is being paid out.

15. In a towing engine, a winding drum, a fluid pressure operated engine for operating said drum, means whereby an increase on the hawser stress automatically causes a reduction in fluid pressure on the engine, auxiliary means acting subsequent to said reduction of pressure to increase the pressure in opposition to the hawser while the latter is being paid out.

16. In a towing engine, a winding drum, a fluid pressure operated engine for operating said drum, means responsive to changes of tension in the hawser for automatically increasing the fluid pressure on the engine when the hawser tension decreases, and for decreasing the fluid pressure on the engine when the hawser tension increases, auxiliary means responsive to movements of the drum whereby a reduction in pressure by said first-named means is followed by an increase in pressure, and an increase in pressure by said first-named means is followed by a decrease in pressure, and a slip-connection between said drum and said auxiliary means.

17. In a towing engine, a winding drum, a fluid pressure operated engine for operating the drum, valve means for controlling the fluid pressure on the engine, means responsive to changes of tension on a hawser wound on the drum for operating said valve means, and means acting in response to rotation of the drum whereby an increase in pressure by said valve means on the engine is followed by a reduction of pressure, and a reduction of pressure by said valve means on the engine is followed by an increase pressure.

18. In a towing engine, a winding drum, a fluid pressure operated engine for operating the drum, valve means for controlling fluid pressure on said engine, means whereby said valve is responsive to changes of tension in a hawser wound on the drum, and auxiliary means for operating said valve means including a two-part shaft, and a slip connection between said shaft parts.

19. In a towing engine, a winding drum, a fluid pressure operated engine for operating the drum, valve means for controlling fluid pressure on said engine, means whereby said valve is responsive to changes of tension in a hawser wound on the drum, auxiliary means for operating said valve means including a two-part shaft, a slip-connection between said shaft parts, and means for arresting the movement of one of said shaft parts when a determined movement has been given the valve.

20. In a towing engine, a winding drum, a fluid pressure operated engine for operating the drum, valve means for controlling fluid pressure on the engine, means whereby said valve means is responsive to changes of tension on a hawser wound on said drum, auxiliary operating means driven by said drum and acting on said valve, said auxiliary means consisting of a two-part shaft, one part of which is connected to the drum and the other to the valve, and a slip-connection forming a driving connection between said shaft parts.

21. In a towing engine, a winding drum, a fluid pressure operated engine for operating the drum, valve means for controlling fluid pressure on the engine, means whereby said valve means is responsive to changes of tension on a hawser wound on said drum, and auxiliary operating means driven by said drum and acting on said valve, said auxiliary means consisting of a two-part shaft, one part of which is connected to the drum and the other to the valve, and a slip-connection forming a driving connection between said shaft parts, and means for arresting movement of the shaft part which is connected to the valve means.

22. In a towing engine, a winding drum, a fluid pressure operated engine for operating the drum, valve means for controlling fluid pressure on the engine, means whereby said valve means is responsive to changes of tension in a hawser wound on the drum, and auxiliary valve operating means responsive to movement of the drum, said auxiliary means comprising a two-part shaft, one part of which is connected to the drum and the other to the valve means, a slip-connection connecting said shaft parts, a travelling locking nut threaded on the shaft part which is geared to the valve, and stop means cooperable with said nut to lock said shaft part against rotation after a determined movement thereof.

23. In a towing engine, a winding drum, a rocking frame on which said drum has bearings, a fluid pressure operated engine for operating said drum, valve means for controlling fluid pressure on the engine, means whereby rocking movement of said frame controls said valve means to reduce the fluid pressure on the engine when the tension on a hawser wound on the drum is increased, and to increase the fluid pressure when the tension on the hawser is reduced, and auxiliary means responsive to rotation of the drum for increasing the fluid pressure following a reduction thereof by said first-named means, and for reducing the fluid pressure following an increase thereof by said first-named means.

24. In a towing engine, a winding drum, a rocking frame on which said drum has bearings, a fluid pressure operated engine for operating said drum, valve means for controlling fluid pressure on the engine, means whereby rocking movement of said frame controls said valve means to increase the fluid pressure on the engine when the tension on a hawser wound on the drum is reduced, and to reduce the fluid pressure when the tension on the hawser is increased, auxiliary means responsive to rotation of the drum for increasing the fluid pressure following a reduction thereof by said first-named means, and for reducing the fluid pressure following an increase thereof by said first-named means, and means for limiting the extent of action of the said auxiliary means.

25. In a towing engine, a winding drum, a rocking frame upon which said drum is mounted, a fluid pressure operated engine for operating the drum, valve means for controlling fluid pressure on the engine, means whereby the rocking movement of the drum operates said valve to decrease the pressure on the engine when the tension on a hawser wound on the drum increases, and means responsive to rotative movement of the drum whereby said reduction of fluid pressure is followed by an increase of fluid pressure.

26. In a towing engine, a winding drum, a rocking frame upon which said drum is mounted, a fluid pressure operated engine for operating the drum, valve means for controlling fluid pressure on the engine, means whereby the rocking movement of the drum operates said valve to decrease the pressure on the engine when the tension on a hawser wound on the drum increases, means responsive to rotative movement of the drum whereby said reduction of fluid pressure is followed by an increase of fluid pressure, and means for limiting the action of said last-named means in increasing said fluid pressure.

27. In a towing engine, a drum adapted to have a towing hawser wound thereon, a rocking support upon which said drum is mounted to move with said support, a fluid pressure engine for operating the drum, means whereby rocking movement of said support and drum controls said engine, and friction means for steadying the movement of said support.

28. In a towing engine, a drum adapted to have a towing hawser wound thereon, a rocking support upon which said drum is mounted to move with said support, a fluid pressure engine for operating the drum, means whereby rocking movement of said support and drum controls said engine, and yielding friction means for steadying the movement of said support.

29. In a towing engine, a drum adapted to have a towing hawser wound thereon, a rocking support upon which said drum is mounted to move with said support, a fluid pressure engine for operating the drum, a valve controlling the engine, means whereby rocking movement of said support and drum controls said engine, and friction means steadying the movement of said support.

30. In a towing engine, a drum adapted to have a towing hawser wound thereon, a rocking support upon which said drum is mounted to move with said support, a fluid pressure engine for operating the drum, means whereby rocking movement of said support and drum controls said engine, and means for steadying the movement of the support, said means comprising movable devices having inclined faces in sliding contact, and yielding means normally tending to maintain said faces in contact.

31. In a towing engine, a drum adapted to have a towing hawser wound thereon, a rocking support upon which said drum is mounted to move with said support, a fluid pressure engine for operating the drum, means whereby rocking movement of said support and drum controls said engine, a movable member upon which the drum rests, said member having an inclined face, a second movable member having an inclined face in contact with said first named inclined face, and yielding means urging said inclined faces into contact.

32. In a towing engine, a drum adapted to have a towing hawser wound thereon, a rocking support upon which said drum is mounted to move with said support, a fluid pressure engine for operating the drum, means whereby rocking movement of said support and drum controls said engine, a movable member upon which the drum rests, said member having an inclined face, a second movable member having an inclined face in contact with said first-named inclined face, and spring means urging said inclined faces into contact.

33. In a towing engine, a drum adapted to have a towing hawser wound thereon, a rocking support upon which said drum is mounted to move with said support, a fluid pressure engine for operating the drum, means whereby rocking movement of said support and drum controls said engine, a pair of members arranged adjacent said support and having oppositely inclined faces, a wedge member arranged with its inclined faces in sliding contact with the inclined faces on said members, said wedge member being adapted to engage said support, and yielding means urging said pair of members into engagement with said wedge member.

34. In a towing engine, a winding drum, a fluid pressure operated engine for operating said drum, means whereby an increase of stress on a hawser wound on said drum causes a reduction of fluid pressure on said engine to permit the drum to pay out the hawser, means for automatically increasing said fluid pressure while the hawser is being paid out, said first-named means acting automatically subsequent to the operation of said second means to increase the steam pressure to wind in the hawser, and said second means acting to increase the steam pressure while the hawser is being wound in.

In testimony whereof I have hereunto signed my name in the presence with two subscribing witnesses.

THOMAS SPENCER MILLER.

Witnesses:
CHAS. C. PIERCE,
MATTHEW H. REDLER.